United States Patent
Sasaki et al.

(10) Patent No.: US 7,641,054 B2
(45) Date of Patent: Jan. 5, 2010

(54) COMPOSITE SEMIPERMEABLE MEMBRANE, PRODUCTION PROCESS THEREOF, AND ELEMENT, FLUID SEPARATION EQUIPMENT AND TREATMENT METHOD FOR BORON-CONTAINING WATER USING THE SAME

(75) Inventors: Takao Sasaki, Shiga (JP); Hiroki Tomioka, Shiga (JP); Koji Nakatsuji, Shiga (JP)

(73) Assignee: Toray Industries, Inc., Tokyo (JP)

( * ) Notice: Subject to any disclaimer, the term of this patent is extended or adjusted under 35 U.S.C. 154(b) by 12 days.

(21) Appl. No.: 11/666,752

(22) PCT Filed: Nov. 4, 2005

(86) PCT No.: PCT/JP2005/020670

§ 371 (c)(1), (2), (4) Date: May 2, 2007

(87) PCT Pub. No.: WO2006/051888

PCT Pub. Date: May 18, 2006

(65) Prior Publication Data

US 2008/0000843 A1 Jan. 3, 2008

(30) Foreign Application Priority Data

Nov. 15, 2004 (JP) ............................. 2004-330273

(51) Int. Cl.
B01D 29/00 (2006.01)
B01D 39/14 (2006.01)
B01D 67/00 (2006.01)

(52) U.S. Cl. ............. 210/490; 210/500.38; 210/500.27; 264/48; 422/244; 422/245

(58) Field of Classification Search ............ 210/500.27, 210/500.38, 490; 427/244–245; 264/48
See application file for complete search history.

(56) References Cited

U.S. PATENT DOCUMENTS

| | | | | |
|---|---|---|---|---|
| 4,634,531 A | * | 1/1987 | Nakagawa et al. | 210/639 |
| 4,769,148 A | * | 9/1988 | Fibiger et al. | 210/500.38 |
| 4,857,363 A | * | 8/1989 | Sasaki et al. | 427/245 |
| 4,895,660 A | * | 1/1990 | Kershner et al. | 210/640 |
| 4,948,506 A | * | 8/1990 | Lonsdale et al. | 210/490 |
| 4,960,518 A | * | 10/1990 | Cadotte et al. | 210/639 |
| 4,964,998 A | | 10/1990 | Cadotte et al. | |
| 5,051,178 A | | 9/1991 | Uemura et al. | |
| 5,057,421 A | * | 10/1991 | Hofmann et al. | 435/182 |
| 5,160,619 A | | 11/1992 | Yamaguchi et al. | |

(Continued)

FOREIGN PATENT DOCUMENTS

EP  1 157 734 A1  11/2001

(Continued)

*Primary Examiner*—Ana M Fortuna
(74) *Attorney, Agent, or Firm*—Oliff & Berridge, PLC

(57) ABSTRACT

A composite semipermeable membrane, which comprises a separating functional layer comprising a reactant of polyfunctional amine with polyfunctional acid halide, wherein a water-soluble organic material is in contact with the separating functional layer, and the separating functional layer has a boron removal ratio of 95% or more, when seawater at 25° C. having a pH of 6.5, a boron concentration of 5 ppm and a TDS concentration of 3.5% by weight is permeated under an operation pressure of 5.5 MPa.

18 Claims, 1 Drawing Sheet

U.S. PATENT DOCUMENTS

| | | |
|---|---|---|
| 5,234,598 A | 8/1993 | Tran et al. |
| 5,614,099 A * | 3/1997 | Hirose et al. .............. 210/653 |
| 5,843,351 A | 12/1998 | Hirose et al. |
| 6,337,018 B1 * | 1/2002 | Mickols .............. 210/500.38 |
| 6,709,590 B1 | 3/2004 | Hirose |
| 6,878,278 B2 * | 4/2005 | Mickols .............. 210/500.38 |
| 6,913,694 B2 * | 7/2005 | Koo et al. .............. 210/500.38 |

FOREIGN PATENT DOCUMENTS

| | | |
|---|---|---|
| JP | A 59-115704 | 7/1984 |
| JP | A 62-110706 | 5/1987 |
| JP | A 1-180208 | 7/1989 |
| JP | A 2-115027 | 4/1990 |
| JP | A 11-19493 | 1/1999 |
| JP | B2 3031763 | 2/2000 |
| JP | A 2001-259388 | 9/2001 |
| JP | A 2004-243198 | 9/2004 |

* cited by examiner

COMPOSITE SEMIPERMEABLE MEMBRANE, PRODUCTION PROCESS THEREOF, AND ELEMENT, FLUID SEPARATION EQUIPMENT AND TREATMENT METHOD FOR BORON-CONTAINING WATER USING THE SAME

This application is a 371 of PCT/JP05/20670 filed on Nov. 04, 2005, which claims foreign priority over Japan 2004-330273, filed on Nov. 15, 2004.

TECHNICAL FIELD

The present invention relates to a composite semipermeable membrane useful for selective separation of a liquid mixture, and to a production process thereof. For example, the present invention relates to a composite semipermeable membrane which comprises a separating functional layer comprising polyamide formed on a porous substrate film and which is favorable for removing boron from seawater or brackish water, to a production process thereof, and to an element, a fluid separation equipment and treatment method for boron-containing water using the same.

BACKGROUND ART

Recently, desalting seawater through a composite semipermeable membrane has been tried, and now, it has been put into practical use in water plants all over the world. A composite semipermeable membrane generally comprises a separating functional layer coated on a porous substrate film. When the separating functional layer is formed by using crosslinked aromatic polyamide, there are such advantages that the layer is stiff and rigid since it contains a benzene ring and that the layer can be readily formed by interfacial polycondensation of aromatic polyfunctional amine and aromatic polyfunctional acid halide, and other advantages such as a high salt removal ratio and a high permeation flow rate are known (JP-A-1-180208 and JP-A-2-115027).

However, the water quality standard in the art is controlled more and more severely these days. In particular, it is difficult to reduce the minor boron in seawater to a level acceptable for drinking water in ordinary treatment, and some composite semipermeable membranes have been proposed for solving this problem (JP-A-11-19493 and JP-A-2001-259388). However, since these membranes are expected to have a membrane permeation flow rate of 0.5 m$^3$/m$^2$/day or less and a boron removal ratio at most about 91 to 92% when seawater at 25° C. having a pH of 6.5, a boron concentration of 5 ppm and a TDS concentration of 3.5% by weight is permeated under an operation pressure of 5.5 MPa, development of composite semipermeable membranes which have higher solute-rejection performance has been desired.

As means for improving the solute-rejection performance of composite semipermeable membranes, a method in which a novel reactant is added to the reaction solution is exemplified. Since this method does not so much differ from conventional methods, it is useful as a simple improved method. For example, it is described that in the composite semipermeable membrane, crosslinked polyamide is constituted by a polyamine component having at least two amino groups in the molecule, and an acid component, as a novel reactant, which comprises a linear aliphatic poly-acid halide having at least two halogenocarbonyl groups in the molecule (Japanese Patent 3,031,763). Although it is described that the method provides a composite semipermeable membrane having a high salt removal ratio and a high permeation flow rate and a production process thereof, it is still impossible to further increase the boron rejection ratio according to the method.

On the other hand, it has also been attempted to conduct processing of bringing a reagent into contact with a semipermeable membrane to improve the selective separating performance and improve the retainability thereof. For example, a method of bringing a semipermeable membrane into contact with two or more kinds of aqueous solutions containing water soluble compounds reactive to each other successively can be mentioned (JP-A-59-115704). While the method is useful for the improvement of long time stability of the desalting ratio of the semipermeable membrane, the boron removal ratio has not yet been improved to reach as high as 95%. Further, a method of using an anionic surfactant for the post-treatment is also mentioned (JP-A-62-110706). While the method is useful for suppressing lowering of the permeation flow rate in the sterilization of the semipermeable membrane, the boron removal ratio has not yet been improved to reach as high as 95%.

Further, a method of coating the surface of a separating functional polyamide layer with a solution of a compound having at least one aldehyde group is also mentioned (JP-A-2004-243198). While the method is useful for attaining aging-stability and a high permeation flow rate, the boron removal ratio has not yet been improved to reach as high as 95%. Further, while a method of acting an amine reactive reagent or an oxidizing agent to a polyamide composite membrane can also be mentioned (U.S. Pat. No. 4,964,998), the boron removal ratio has not yet been improved to reach as high as 95%.

DISCLOSURE OF THE INVENTION

An object of the present invention is to provide a composite semipermeable membrane having a high salt removal ratio and high rejection performance for even substances non-dissociative in a neutral region such as boric acid, and to provide a production process thereof.

In order to accomplish the above and other objects, the present invention provides a composite semipermeable membrane, which comprises a separating functional layer comprising a reactant of polyfunctional amine with polyfunctional acid halide formed on a porous substrate film, wherein the composite semipermeable membrane has a suitable permeation flow rate and a boron removal ratio of 95% or more by contacting a water-soluble organic material with the separating functional layer.

Specifically, the present invention relates to the followings:
(1) A composite semipermeable membrane, which comprises
   a separating functional layer comprising a reactant of polyfunctional amine with polyfunctional acid halide formed on a porous substrate film,
   wherein a water-soluble organic material is in contact with the separating functional layer, and
   the separating functional layer has a boron removal ratio of 95% or more, when seawater at 25° C. having a pH of 6.5, a boron concentration of 5 ppm and a TDS concentration of 3.5% by weight is permeated under an operation pressure of 5.5 MPa.
(2) The composite semipermeable membrane according to (1), wherein the separating functional layer has a mean pore radius of 0.25 nm to 0.35 nm and a vacancy content of 0.2 nm$^3$% to 0.3 nm$^3$%, measured by positron annihilation lifetime spectroscopy.
(3) The composite semipermeable membrane according to (1) or (2), wherein the water-soluble organic material is a material which is in contact with an amino group constituting the separating functional layer to thereby form a covalent bond.

(4) The composite semipermeable membrane according to (1) or (2), wherein the water-soluble organic material is a surfactant.

(5) The composite semipermeable membrane according to (1) or (2), which is obtainable by contacting with the water-soluble organic material a composite semipermeable membrane to be treated, which has a salt removal ratio of 99.5% or more or a salt transmission coefficient of $3 \times 10^{-8}$ m/s or less, when seawater at 25° C. having a pH of 6.5, a boron concentration of 5 ppm and a TDS concentration of 3.5% by weight is permeated under an operation pressure of 5.5 MPa.

(6) The composite semipermeable membrane according to (1) or (2), wherein the polyfunctional amine is aromatic polyfunctional amine.

(7) The composite semipermeable membrane according to (3), wherein the water-soluble organic material comprises a compound or derivative selected from the group consisting of a compound having a formyl group, a derivative of a compound having a formyl group, a compound having an oxilanyl group, a derivative of a compound having a oxilanyl group, an acid halide, a carbonate derivative, a carbamate derivative and an alkyl halide.

(8) The composite semipermeable membrane according to (7), wherein the compound having a formyl group is aldehyde having at least two functional groups which are capable of binding to amine via a covalent bond.

(9) The composite semipermeable membrane according to (7), wherein the compound having a oxilanyl group is epoxide having at least two functional groups which are capable of binding to amine via a covalent bond.

(10) The composite semipermeable membrane according to (1) or (2), wherein the water-soluble organic material has a molecular weight of 1,000 or less.

(11) A process for producing a composite semipermeable membrane, which comprises:

contacting polyfunctional amine with the polyfunctional acid halide on a porous substrate film to thereby form a separating functional layer comprising polyamide by means of polycondensation; and contacting the separating functional layer with a water-soluble organic material until a boron removal ratio, when seawater at 25° C. having a pH of 6.5, a boron concentration of 5 ppm and a TDS concentration of 3.5% by weight is permeated under an operation pressure of 5.5 MPa, becomes 95% or more.

(12) The process according to (11), wherein the separating functional layer has a mean pore radius of 0.25 nm to 0.35 nm and a vacancy content of 0.2 nm$^3$% to 0.3 nm$^3$%, measured by positron annihilation lifetime spectroscopy.

(13) The process according to (11) or (12), wherein the water-soluble organic material is a material which is in contact with an amino group constituting the separating functional layer to thereby form a covalent bond.

(14) The process according to (11) or (12), wherein the water-soluble organic material is a surfactant.

(15) The process according to (11) or (12), wherein the water-soluble organic material is brought into contact with a composite semipermeable membrane to be treated, which has a salt removal ratio of 99.5% or more or a salt transmission coefficient of $3 \times 10^{-8}$ m/s or less, when seawater at 25° C. having a pH of 6.5, a boron concentration of 5 ppm and a TDS concentration of 3.5% by weight is permeated under an operation pressure of 5.5 MPa.

(16) The process according to (11) or (12), wherein the polyfunctional amine is aromatic polyfunctional amine.

(17) The process according to (13), wherein the water-soluble organic material comprises a compound or derivative selected from the group consisting of a compound having a formyl group, a derivative of a compound having a formyl group, a compound having an oxilanyl group, a derivative of a compound having a oxilanyl group, an acid halide, a carbonate derivative, a carbamate derivative and an alkyl halide.

(18) The process according to (17), wherein the compound having a formyl group is aldehyde having at least two functional groups which are capable of binding to amine via a covalent bond.

(19) The process according to (17), wherein the compound having a oxilanyl group is epoxide having at least two functional groups which are capable of binding to amine via a covalent bond.

(20) The process according to (11) or (12), wherein the water-soluble organic material has a molecular weight of 1,000 or less.

(21) A composite semipermeable membrane element which comprises the composite semipermeable membrane according to (1) or (2) or a composite semipermeable membrane produced by the process according to (11) or (12).

(22) A fluid separation equipment which comprises the composite semipermeable membrane element according to (21).

(23) A method for boron-containing water treatment, which comprises using the composite semipermeable membrane according to (1) or (2) or a composite semipermeable membrane produced by the process according to (11) or (12).

BEST MODE FOR CARRYING OUT THE INVENTION

Figure 1:
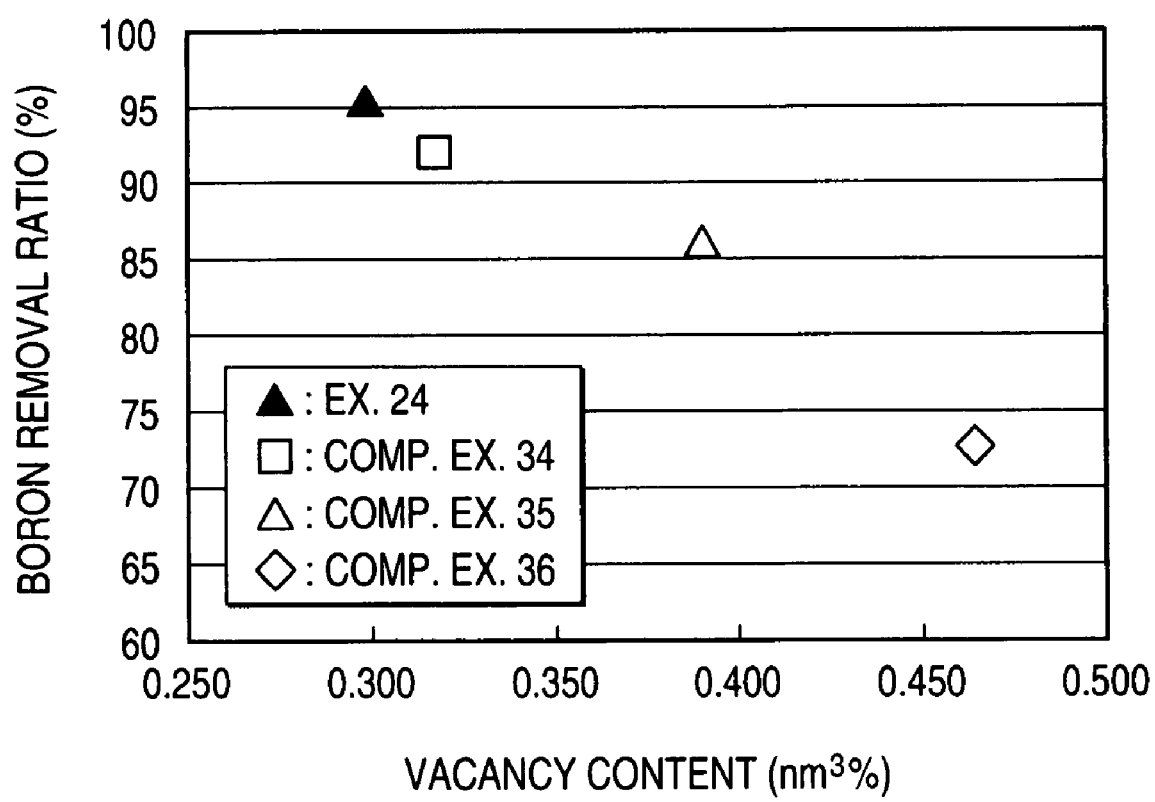
FIG. 1 is a graph showing the relationship between the vacancy content and the boron removal ratio of the separating functional layer in the composite semipermeable membrane.

The present invention provides a composite semipermeable membrane which has high salt removal performance and can reject even substances, at a high removal ratio, which are non-dissociative in a neutral region and are therefore hardly removed to a high extent with conventional reverse osmosis membranes. Accordingly, since the composite semipermeable membrane can reject boron, at a high removal ratio, which is heretofore hardly removed to a high extent, particularly in desalting of seawater, it can be suitably used for preparation of drinking water by reverse osmosis.

The composite semipermeable membrane of the present invention is used suitably as a composite semipermeable membrane for obtaining fresh water with less boron content from brine water or sea water, and this is a composite semipermeable membrane in which a water-soluble organic material is brought into contact with a separating functional layer comprising a reaction product of a polyfunctional amine and a polyfunctional acid halide formed on a porous substrate film, having a boron removal ratio of 95% or more, when seawater at 25° C. having a pH of 6.5, a boron concentration of 5 ppm and a TDS concentration of 3.5% by weight is permeated under an operation pressure of 5.5 MPa.

Generally, TDS means a total dissolved solid amount, which is represented by "(mass)÷(volume)" or weight ratio. According to the definition, it can be calculated based on the weight of residues when water is filtered through a 0.45 μm filter at a temperature of 39.5 to 40.5° C. and, more conveniently, it is converted from the practical salt content (S).

The porous substrate film in the composite membrane of the present invention does not substantially have separating performance of ions, etc., and is used for reinforcing the separating functional layer which substantially has separating performance of the membrane. The pore size and the pore distribution in the porous substrate film are not particularly limited. For example, it is preferable that the substrate film has uniform pores, or has pores distributed in such a manner that their size gradually increases from the side of the film face coated with the separating functional layer to the other side thereof and the pore size on the side of the separating functional layer-coated face of the film is preferably from 0.1 to 100 nm.

The material and the shape of the porous substrate film are not also particularly limited. For example, preferred are polysulfone, cellulose acetate, polyvinyl chloride or their mixtures reinforced with a fabric which comprises, as a main component, at least one selected from polyester and aromatic polyamide. Polysulfone having high chemical, mechanical and thermal stability is especially preferred for the used material.

Specifically, polysulfone having a repeating unit of a chemical formula described below is more preferred, since its pore size control is easy and its dimensional stability is high.

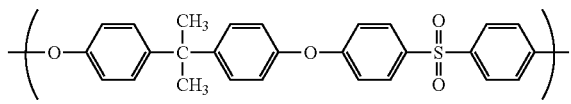

For example, an N,N-dimethylformamide (DMF) solution of the polysulfone is cast onto a base material, such as a densely-woven or nonwoven fabric of polyester, to form thereon a layer having a predetermined thickness, followed by wet-solidification in water to give a porous substrate film. The major part of the surface of the substrate film thus formed has pores having a diameter of 10 nm or less.

The thickness of the aforesaid porous substrate film and of the base material will affect the strength of the composite semipermeable membrane and the packing density when an element is produced. In order to obtain sufficient mechanical strength and packing density, it is preferably from 50 to 300 μm, and more preferably from 100 to 250 μm. Furthermore, the thickness of the porous substrate is preferably from 10 to 200 μm, and more preferably from 30 to 100 μm.

The porous substrate film formation can be observed by means of a scanning electron microscope, a transmission electron microscope or an atomic force microscope. For example, where observation is carried out with a scanning electron microscope, the porous substrate is peeled away from the base material, after which it is sectioned by a freeze-sectioning method, to produce the sample for observation of the cross-section. This sample is thinly coated with platinum, platinum-palladium or ruthenium tetroxide, preferably with ruthenium tetroxide, and observation carried out with a high resolution field emission type scanning electron microscope (UHR-FE-SEM) at an acceleration voltage of 3 to 6 kV. For the high resolution field emission type scanning electron microscope, there can be used for example a model S-900 type electron microscope made by Hitachi Ltd. The film thickness of the porous substrate and the diameter of the surface pores is determined from the electron micrograph obtained. Now, the thickness and pore diameter referred to in the present invention are average values.

It is preferred that the separating functional layer is crosslinked polyamide which is chemically stable against acid or alkali or contains crosslinked polyamide as a main component. The crosslinked polyamide is formed by interfacial polycondensation of polyfunctional amine and polyfunctional acid halide, and at least one of the polyfunctional amine and the polyfunctional acid halide contains a trifunctional or higher polyfunctional compound.

The thickness of the separating functional layer is generally from 0.01 to 1 μm, and preferably from 0.1 to 0.5 μm, in order to obtain sufficient separating performance and permeation water amount.

The polyfunctional amine means an amine having at least two primary and/or secondary amino groups in one molecule. Examples include aromatic polyfunctional amines in which at least two amino groups bind to the benzene ring at an ortho-, meta- or para-position, such as phenylenediamine, xylylenediamine, 1,3,5-triaminobenzene, 1,2,4-triaminobenzene, and 3,5-diaminobenzoic acid; aliphatic amines, such as ethylenediamine and propylenediamine; alicyclic polyfunctional amines, such as 1,2-diaminocyclohexane, 1,4-diaminocyclohexane, piperazine, 1,3-bispiperidylpropane, and 4-aminomethylpiperazine; and the like. Above all, aromatic polyfunctional amines having 2 to 4 primary and/or secondary amino groups in one molecule are preferred in view of the selective separability, permeability and heat resistance of the membrane. As the polyfunctional aromatic amines, preferred are m-phenylenediamine, p-phenylenediamine, and 1,3,5-triaminobenzene. Among these, m-phenylenediamine (hereinafter referred to as "m-PDA") is more preferred in view of the availability and handlability. These polyfunctional amines can be used alone or as a mixture thereof.

The polyfunctional acid halide means acid halide having at least two halogenocarbonyl groups in one molecule. Examples thereof include trifunctional acid halides, for example, trimesic acid chloride, 1,3,5-cyclohexanetricarboxylic acid trichloride, 1,2,4-cyclobutanetricarboxylic acid trichloride, and the like; and bifunctional acid halides, for example, aromatic bifunctional acid halides, such as biphenyldicarboxylic acid dichloride, azobenzenedicarboxylic acid dichloride, terephthalic acid chloride, isophthalic acid chloride, and naphthalenedicarboxylic acid chloride; aliphatic bifunctional acid halides, such as adipoyl chloride and sebacoyl chloride; alicyclic bifunctional acid halides, such as cyclopentanedicarboxylic acid dichloride, cyclohexanedicarboxylic acid dichloride, and tetrahydrofurandicarboxylic acid dichloride; and the like. In view of the reactivity with polyfunctional amine, the polyfunctional acid halide is preferably polyfunctional acid chloride. In view of the selective separability and the heat resistance of the membrane, preferred is polyfunctional aromatic acid chloride having 2 to 4 carbonyl chloride groups in one molecule. Above all, more preferred is trimesic acid chloride in view of the availability and handlability. These polyfunctional acid halides can be used alone or as a mixture thereof.

The water-soluble organic material means an organic compound capable of being dissolved by 0.01 ppm or more in water. A preferred organic compound is selected depending on the composition and the type of the separating functional layer. The criterion for the selection is the intensity of interaction relative to the separating functional layer substantially having the separating performance, which is judged based on a covalent bond, electrostatic interaction, a hydrogen bond, a coordination bond and non-polar interaction (van der Waals bond, CH-π interaction, π-π stacking interaction, etc.) collectively. The intensity of the interaction is preferably 10 kJ/mol or more. Further, an inorganic compound may also be mixed, if necessary.

The water-soluble organic material is preferably in the form of liquid or gas, a solution of a water-soluble organic material, or a mixture of a water-soluble organic material and a chemically inert gas. Further, the aqueous solution of a water-soluble organic material is further preferred being convenient in view of handling.

The thus obtained composite semipermeable membrane has a boron removal ratio of 95% or more, when sea water at a temperature of 25° C., at a pH of 6.5, with a boron concentration of 5 ppm, and at a TDS of 3.5% by weight is permeated is permeated under an operation pressure of 5.5 MPa. The water permeation flow rate is preferably from 0.2 to 2.0 $m^3/m^2$/day, more preferably from 0.4 to 1.5 $m^3/m^2$/day, under the measuring conditions described above.

Further, upon contact of the water-soluble organic material for obtaining a composite semipermeable membrane having the foregoing performance, a composite semipermeable membrane to be treated preferably has a salt removal ratio of 99.5% or more or a salt transmission coefficient of $3 \times 10^{-8}$ m/s or less, when sea water at a temperature of 25° C., at a pH of 6.5, with a boron concentration of 5 ppm, and at a TDS of 3.5% by weight is permeated is permeated under an operation pressure of 5.5 MPa. When a composite semipermeable membrane to be treated which does not satisfy these ranges is treated, it is necessary to contact with a water-soluble organic material at high concentration for a long time to sometimes worsen the processing efficiency remarkably. More preferably, the salt removal ratio is 99.7% or more or the salt transmission coefficient is $3 \times 10^{-8}$ m/s or less. "Salt" referred to in the salt transmission coefficient has the same meaning as "salt" in practical salt content (S).

In a case of a separating functional layer comprising a polymer containing a crosslinked aromatic polyamide as a component, either an organic material forming a covalent bond in contact with an amino group constituting the separating functional layer to form a covalent bond, or a surfactant can be used suitably for the water-soluble organic material.

It is considered reasonably that the amino group in the separating functional layer is present at the terminal portion of a polyamide molecular chain, or in a low molecular weight compound (monomer and/or oligomer) adsorbed and retained in the space of the separating functional layer, and the water-soluble organic material forming the covalent bond in contact with the amino group denotes a compound having at least one element of forming the covalent bond together with the amino group, or forming the covalent bond by self-reaction with the amino group being as a base catalyst.

Specifically, it includes, for example, compounds having at least one functional group among a halogenated carbonyl group, a formyl group, a halogenated alkyl group, a hydroxyl group, an oxilanyl group, and an isocyanate group, or acid anhydride, ester, a compound having a carbon double bond, sulfonic acid halide, etc. Among these, since compounds particularly having high effect of improving the boron removal ratio are those having either a formyl group or an oxilanyl group and/or derivatives thereof, organic materials containing such compounds or derivatives thereof are used preferably as the water-soluble organic material. The derivatives mean synthons, which are organic materials having functional groups capable of tautomeric conversion with the functional groups described above by using known synthesis reactions.

The compounds having a formyl group may be any one of aliphatic, aromatic or heterocyclic compounds. For example, they include formaldehyde, paraformaldehyde, acetaldehyde, propionaldehyde, butylaldehyde, isobutylaldehyde, palmitoaldehyde, stearylaldehyde, olealdehyde, glycidylaldehyde, 3-hydroxypropanal, ribose, glyoxylicaldehyde, 2,4-hexadienal, benzaldehyde, salicylaldehyde, 2-naphtaldehyde, hydroxybenzaldehyde, dihydroxybenzaldehyde, dimethylaminobenzaldehyde, formylbenzaldehyde, nicotinaldehyde, isoniconinaldehyde, 2-furaldehyde, glycolaldehyde, lactaldehyde, glycelaldehyde, tartaraldehyde, citraldehyde, pyruvaldehyde, acetoacetaldehyde, benzylaldehyde, anthranylaldehyde, propiolaldehyde, acrolein, methacrolein, crotonaldehyde, cinnamaldehyde, glyoxal, malonaldehyde, 2-chloromalonaldehyde, succinaldehyde, glutaraldehyde, adipaldehyde, malealdehyde, fumaraldehyde, phthalaldehyde, isophthalaldehyde, terephthalaldehyde and ethylenediaminetetraacetaldehyde. Derivatives thereof include, for example, hydration products, acetals, and hydrogen sulfite adducts. Further, an aldehyde having two or more functional groups capable of covalent bonding with amides are preferred as the compounds that can expect various interactions. Specifically, they include, glycidylaldehyde, acrolein, methacrolein, glyoxal, malonaldehyde, 2-chloromalonaldehyde, succinaldehyde, glutaraldehyde, adipaldehyde, phthalaldehyde, isophthalaldehyde, and terephthalaldehyde.

Compounds having an oxilanyl group include, for example, epichlorohydrin, glycidylaldehyde, allyl glycidyl ether, 2-ethylhexyl glycidyl ether, phenyl glycidyl ether, phenol pentaethylene glycol glycidyl ether, p-tert-butylphenyl glycidyl ether, dibromophenyl glycidyl ether, lauryl alcohol pentadecaethylene glycol glycidyl ether, resorcinol diglycidyl ether, neopentyl glycol diglycidyl ether, 1,6-hexanediol diglycidyl ether, glycerol polyglycidyl ether, pentaerythritol polyglycidyl ether, diglycerol polyglycidyl ether, polyglycerol polyglycidyl ether, sorbitol polyglycidyl ether, diglycidylterephthalate, diglycidyl-o-phthalate, N-glycidylphthalimide, ethylene glycol diglycidyl ether, diethylene glycol diglycidyl ether, polyethylene glycol diglycidyl ether, propylene glycol diglycidyl ether, tripropylene glycol diglycidyl ether, polypropylene glycol diglycidyl ether, glycerine diglycidyl ether, and trimethyrol propane triglycidyl ether. Derivatives thereof include ring-opened products by hydrogen halide. Further, epoxides having two or more functional groups capable of covalent bonding with amines are preferred as compounds that can expect various interactions. Specifically, they include epichorohydrin, glycidyl aldehyde, allyl glycidyl ether, resorcinol diglycidyl ether, neopentyl glycol diglycidyl ether, 1,6-hexanediol diglycidyl ether, glycerol polyglycidyl ether, pentaerythritol polyglycidyl ether, diglycerol polyglycidyl ether, polyglycerol polyglycidyl ether, sorbitol polyglycidyl ether, diglycidylterephthalate, diglycidyl-o-phthalate, ethylene glycol diglycidyl ether, diethylene glycol diglycidyl ether, polyethylene glycol diglycidyl ether, propylene glycol diglycidyl ether, tripropylene glycol diglycidyl ether, polypropylene glycol diglycidyl ether, glycerine diglycidyl ether, and trimethylol propane triglydicyl ether.

Compounds having a halogenated carbonyl group include aromatic acid halides such as trimesic acid chloride, terephthalic acid chloride, isophthalic acid chloride, biphenyldicarboxylic acid dichloride, naphthalenedicarboxylic acid dichloride, benzoyl chloride, 2-cyanobenzoyl chloride, 3-cyanobenzoyl chloride, 4-cyanobenzoyl chloride, 2-nitrobenzoyl chloride, 3-nitrobenzoyl chloride, 4-nitrobenzoyl chloride, 2-dimethylaminobenzoyl chloride, 3-dimethylaminobenzoyl chloride, 4-dimethylaminobenzoyl chloride, 2-furoyl chloride, 1-naphthoyl chloride, 2-naphthoyl chloride, 2-nicotinoyl chloride, isonicotinoyl chloride, picolinoyl chloride, 2-pyrazine carbonyl chloride, isoxazol-5-carbonyl chloride, and 2-quinoxalinecarbonyl chloride, and aliphatic acid halides such as oxalyl chloride, fumaryl chloride, malonyl chloride, dimethylmalonyl chloride, succinyl chloride, glytaryl chloride, 2,2'-oxydiacetyl chloride, adipoyl chloride, sebacoyl chloride, cyclopentanedicarboxylic acid dichloride, cyclohexanedicarboxylic acid dichloride, tetrahydrofurandicarboxylic acid dichloride, acetyl chloride, propionyl chloride, butyryl chloride, valeryl chloride, isovaleryl chloride, methacroyl chloride, pivaroyl chloride, cynnamoyl chloride, crotonyl chloride, ethylmalonyl chloride, phenylacetyl chloride, cyclopropanecarbonyl chloride, cyclobutanecarbonyl chloride, cyclopentanecarbonyl chloride, cyclohexanecarbonyl chloride, methoxyacetyl chloride, ethoxyacetyl chloride, phenyloxyacetyl chloride, 2-methylphenyloxyacetyl chloride, 2-ethylphenyloxyacetyl chloride, (4-chlorophenyl)oxyacetyl chloride, (phenylthio)acetyl chloride, benzyloxyacetyl chloride, 2-fluoropropionyl chloride, 2-chloropropionyl chlolide, 2-bromopropionyl chloride, heptafluorobutyl chloride, acetoxyacetyl chloride, trifluoroacetyl chloride, trichloroacetyl chloride, (−)-menthyloxyacetyl chloride, and isooxazol-5-carbonyl chloride.

The compounds having a halogenated alkyl group include chloroethane, 1-chloropropane, 2-chloropropane, 1-chlorobutane, 2-chlorobutane, 1-chloro-2-methylpropane, 1-chloro-1,1-dimethylethane, benzyl chloride, allyl chloride, propalgyl chloride, 1,2-dichloethane, 1,3-dochloropropane, 1,4-dichlorobutane, 1,5-dichloropentane, 2-chloroethanol, 3-chloropropanol, 2-chloroethyl methyl ether, 3-chloropropyl methyl ether, bis(2-chloroethyl) ether, chloroacetone, 2-chloroacetophenone, methyl chloroacetate, N,N-dimethylchloro acetoamide, etc. Halogen atoms are not restricted to chlorine but may also be bromine or iodine.

Esters include carbonate ester compounds such as dimethyl carbonate, diethyl carbonate, diallyl carbonate, bis(2-chloroethyl) carbonate, diphenyl carbonate, bis(4-nitrophenyl) carbonate, allylethyl carbonate, ethylene carbonate, vinylene carbonate, 4-methyl-1,3-dioxolan-2-one, dimethyl dicarbonate, diethyl dicarbonate, di-tert-butyl dicarbonate, and dibenzyl dicarbonate, and carbamate ester compounds such as ethyl N-ethyl carbamate, methyl N-phenyl carbamate, ethyl N-(2-chloroethyl) carbamate, ethyl 1-piperidinecarbamate, ethyl 1-piperazinecarbamate, methyl 1-morpholinecarbamate, N-methylurethane, N-phenylurethane, 2-oxazolidinone, and 3-methyl-2-oxazolidine.

It is considered that when the surfactant is brought into contact with the separating functional layer, interaction other than the covalent bond exert between both of them. In this case, it is preferred to use a cationic surfactant when the ζ potential showing the surface charge of the separating functional layer is negative and an anionic surfactant when ζ potential is positive with a view point of providing the effect due to the electrostatic interaction. As the cationic surfactant, a quaternary ammonium salt can be used suitably, and examples include alkyltrimethylammonium chloride, distearyldimethylbenzylammonium chloride, stearyldimethylbenzylammonium chloride, stearyltrimethylbenzylammonium chloride, cetyltrimethylammonium chloride, cetylpyridium chloride, benzalkonium chloride, tri-n-octylammonium chloride, benzetonium chloride, and lauryltrimethylammonium chloride. As the anionic surfactant, alkyl sulfonate salts and sulfate esters can be used preferably.

Furthermore, the molecular weight of the water-soluble organic material is preferably 1,000 or less. When the molecular weight exceeds 1,000, the material less diffuses to the inside of the separating functional layer and it requires a long time for the interaction sometimes failing to obtain a sufficient effect. It is more preferably 800 or less, and most preferably 500 or less.

The solute transmission coefficient can be obtained according to the method described below. The following formulae are known as reverse osmosis transportation equations based on non-equilibrium thermodynamics.

$$Jv = Lp(\Delta P - \sigma \cdot \Delta \pi) \quad (1)$$

$$Js = P(Cm - Cp) + (1 - \sigma)C \cdot Jv \quad (2)$$

Herein, Jv is a permeate flow volume through the membrane (m$^3$/m$^2$/s); Lp is a pure water transmission coefficient of the membrane (m$^3$/m$^2$/s/Pa); ΔP is the pressure difference on both sides of the membrane (Pa); σ is a solute reflection coefficient of the membrane; Δπ is an osmotic pressure difference on both sides of the membrane (Pa); Js is a solute membrane permeation flow rate (mol/m$^2$/s); P is a transmission coefficient of the solute (m/s); Cm is a solute concentration on the surface of the membrane (mol/m$^3$); Cp is a permeate concentration through the membrane (mol/m$^3$); and C is a concentration on both sides of the membrane (mol/m$^3$). The mean concentration C on both sides of the membrane does not have any substantial meaning when the concentration difference on both sides of the membrane is extremely large, such as the case of reverse osmosis membranes. Accordingly, the following formula, which is derived by integrating formula (2) relative to the membrane thickness, is well used.

$$R = \sigma(1 - F)/(1 - \sigma F) \quad (3)$$

wherein $$F = \exp\{-(1 - \sigma)Jv/P\} \quad (4)$$

and R is a true rejection and is defined as follows:

$$R = 1 - Cp/Cm \quad (5)$$

When ΔP is varied, then Lp is computed as in formula (1). When R is measured while Jv is varied and when formulae (3) and (4) are curve-fitted relative to the plotting of R and 1/Jv, then P and σ can be obtained at the same time.

By the above constitution, the composite semipermeable membrane of the present invention can have a boron removal ratio of 95% or more, when seawater at 25° C. having a pH of 6.5, a boron concentration of 5 ppm and a TDS concentration of 3.5% by weight is permeated under an operation pressure of 5.5 MPa. The composite semipermeable membrane provides high boron removal performance which has not been known until now and is useful for removal of boron in desalination of seawater. Also, the boron concentration can be measured by using an ICP emission spectroanalysis apparatus.

Also, in the composite semipermeable membrane of the present invention, it is preferred that the separating functional layer has a mean pore radius of 0.25 nm to 0.35 nm and a vacancy content of 0.2 nm$^3$% to 0.3 nm$^3$%, measured by positron annihilation lifetime spectroscopy.

The positron annihilation lifetime spectroscopy is a technique in which the period from the incidence of a positron in a sample to the annihilation thereof (in the order of several hundred picosec to several ten nanosec) is measured and information such as the size of the pores in the range of 0.1 to 10 nm, number density thereof and size distribution thereof is nondestructively evaluated based on the annihilation lifetime. Details of such measurements are described in, for example, *Jikken Kagaku Koza* (*Experimental Chemistry Course*), 4th edition, Vol. 14, p. 485, edited by The Chemical Society of Japan; Maruzen (1992).

This method is classified into two types depending on the kind of the positron beam source. One is $^{22}$Na method uses a radioactive isotope ($^{22}$Na), and the method is suitable for the pore evaluation of resin, powder, fiber, fluid, etc. Another is a positron beam method using positron beam emitted from an electron beam-type accelerator as the positron beam source, and the method is useful for pore evaluation for thin films with a thickness of about several hundred nm formed on various substrates. Particularly, the latter positron beam method is more preferred as the measuring method for the separating functional layer of a composite semipermeable membrane, because, even in the case where a composite semipermeable membrane is a sample to be measured, the separating functional layer can be measured only by maintaining the sample in a dry state, not requiring any special processing such as separation of the separating functional layer from the composite semipermeable membrane.

In the positron beam method, the measuring zone in the depth direction from the sample surface is adjusted by the energy amount of the positron beam to be impinged on the sample. With the increase of energy, a deeper portion from the sample surface is included in the measuring zone, but the depth depends on the density of the sample. In the measurement of the separating functional layer of a composite semipermeable membrane, the zone with a depth of 50 to 150 nm from the sample surface is usually measured when a positron beam with energy of about 1 keV impinges. Also, for a separating functional layer with a thickness of about 150 to 300 nm, the central portion of the separating functional layer can be selectively measured.

A positron and an electron combine by the Coulomb force with each other to form a positronium Ps which is a neutral hydrogen-like atom. Ps contains para-positronium p-Ps and ortho-positronium o-Ps depending on the spins of the positron and electron being anti-parallel or parallel. The two species are formed in a ratio of 1:3 determined by spin statistics. The mean lifetime of each species is 125 ps for p-Ps and 140 ns for o-Ps, respectively. In a substance in an aggregated state, the probability for o-Ps overlapping with another electron than the one combined in itself, which phenomenon is called pickoff annihilation, increases, resulting in the reduction of the mean lifetime of o-Ps to several ns. Since the annihilation of o-Ps in an insulating material is due to the overlapping of o-Ps with the electron existing in the pore wall of the material, the smaller the pore size is, the more the annihilation speed increases. Namely, the annihilation lifetime τ of o-Ps can be related to the size of pores existing in an insulating material.

The annihilation lifetime τ due to the above-described pickoff annihilation of o-Ps can be derived from the analytical result of the fourth component obtained by dividing the positron annihilation lifetime curve measured by positron annihilation lifetime spectroscopy into four components in conformity with the non-linear least square program, POSITRONFIT (its details are described in, for example, P. Kierkegaard, et al, *Computer Physics Communications*, Vol. 3, p. 240, North Holland Publishing Co. (1972)).

The mean pore radius R in the separating functional layer of the composite semipermeable membrane of the present invention has been obtained by the following equation (6) based on the above-described positron annihilation lifetime τ.

Equation (6) represents the relationship for the case of assuming that o-Ps is present in a pore with a radius R in an electron layer with a thickness of ΔR, whereby ΔR is empirically determined to be 0.166 nm (its details are described in Nakanishi et al:, *Journal of Polymer Science*, Part B: Polymer Physics, Vol. 27, p. 1419, John Wiley & Sons, Inc. (1989).

$$\tau^{-1} = 2\left[1 - \frac{R}{R + \Delta R} + \frac{1}{2\pi}\sin\left(\frac{2\pi R}{R + \Delta R}\right)\right] \quad (6)$$

The vacancy content in the separating functional layer of the composite semipermeable membrane of the present invention can be obtained by the following method. Assuming that the mean pore radius of the separating functional layer of the composite semipermeable membrane obtained by the above-described method is R (nm), the sphere-approximated mean pore volume V (nm$^3$) can be represented as V=(4πR$^3$)/3. From this volume, the vacancy content (nm$^3$%) in the separating functional layer of the composite semipermeable membrane can be represented by V×I. Here, I is the ratio (%) of o-Ps relative to the total impinging number of positron. Some use examples of the vacancy content V×I are disclosed, for example, in the above-described Nakanishi's literature, etc.

For a composite semipermeable membrane to have sufficient solute removing capability as well as permeated water volume, the mean pore radius is preferably from 0.25 nm to 0.35 μm, and the vacancy content is preferably from 0.2 to 0.3 nm$^3$% as described above. When such ranges are satisfied, the composite permeable membrane exhibits a high removing ratio for a non-dissociated solute in the neutral region such as boric acid, and maintains a sufficient permeated water volume.

Next, methods for producing the composite semipermeable membrane of the present invention are described below.

The backbone of the separating functional layer which constitutes the composite semipermeable membrane can be formed, for example, on the surface of a porous substrate film, by interfacial polycondensation of an aqueous solution comprising the above-described polyfunctional amine and a solution of a water-immiscible organic solvent comprising polyfunctional acid halide.

The concentration of the polyfunctional amine in the aqueous solution comprising polyfunctional amine is preferably 2.5 to 10% by weight, and more preferably 3 to 5% by weight. When the concentration is within this range, sufficient salt removal performance and water permeability can be obtained. The aqueous solution comprising polyfunctional amine can contain any other surfactant, organic solvent, alkaline compound and antioxidant not interfering with the reaction of the polyfunctional amine with the polyfunctional acid halide. The surfactant improves the wettability of the surface of the porous substrate film, and is effective for reducing the surface tension between the aqueous amine solution and a non-polar solvent. The organic solvent may act as a catalyst for interfacial polycondensation, and adding it to the reaction system may promote the interfacial polycondensation.

In order to carry out the interfacial polycondensation on the porous substrate film, the above-described aqueous solution of polyfunctional amine is first brought into contact with the film. Preferably, the solution is uniformly and continuously brought into contact with the surface of the film. Specifically, for example, the porous substrate film can be coated with or dipped in the aqueous solution comprising polyfunctional amine. The contact time between the porous substrate film and the aqueous solution comprising polyfunctional amine is preferably from 1 second to 10 minutes, and more preferably from 10 seconds to 3 minutes.

After the aqueous solution comprising polyfunctional amine has been contacted with the porous substrate film, the film is well dewatered so that no liquid drops remain on the film. The well dewatering can inhibit decrease of the film performance such that some liquid drops remained on the film become face defects. The dewatering can be carried out, for example, as described in JP-A-2-78428. Specifically, the porous substrate film is, after contacted with the aqueous solution comprising polyfunctional amine, held vertically so that the excess aqueous solution is made to spontaneously flow downward; or it is exposed to nitrogen air or the like that is blowing toward it through an air nozzle to thereby forcedly dewater it. After thus dewatered, the film surface can be dried to remove a part of the water in the aqueous solution.

Next, the substrate film is, after thus contacted with the aqueous solution comprising polyfunctional amine, further contacted with an organic solvent solution comprising a polyfunctional acid halide to thereby form the skeleton of a crosslinked separating functional layer comprising polyamide by means of interfacial polycondensation.

The concentration of the polyfunctional acid halide in the organic solvent solution is preferably from 0.01 to 10% by weight, and more preferably from 0.02 to 2.0% by weight. When the concentration is within this range, sufficient reaction rate can be obtained and side reactions can be inhibited. Furthermore, an acylation catalyst, such as N,N-dimethylformamide, is preferably added to the organic solvent solution to thereby promote the interfacial polycondensation.

Preferably, the organic solvent is immiscible with water, dissolves acid halides, and does not break the porous substrate film. For it, employable is any one inert to amino compounds and acid halides. Preferred examples include hydrocarbon compounds, such as n-hexane, n-octane, and n-decane.

A method for contacting the organic solvent solution comprising polyfunctional acid halide with the phase of the aqueous amino compound solution can be carried out in the same manner as the method for coating the porous substrate film with the aqueous solution comprising polyfunctional amine.

After the organic solvent solution comprising acid halide is brought into contact with the phase of the aqueous amino compound solution for interfacial polycondensation to form a separating functional layer comprising crosslinked polyamide on the porous substrate film in the manner as above, it is preferred that the excess solvent is removed from the film. For removing it, for example, the film is held vertically so that the excess organic solvent is made to spontaneously flow downward.

The composite semipermeable membrane obtained by the above method can have improved removal performance and water permeability of the composite semipermeable membrane by adding a hot water treatment step at 50 to 150° C., preferably 70 to 130° C., for 1 second to 10 minutes, preferably 1 to 8 minutes, or the like.

On the other hand, the composite semipermeable membrane in which an aliphatic acyl group is further bound to the separating functional layer has suitable performance. Such a composite semipermeable membrane is produced, for example, by contacting an organic solvent solution comprising the above-described polyfunctional acid halide and different aliphatic acid halide with the substrate film after the contact of the above aqueous solution of polyfunctional acid halide, or contacting the above-described polyfunctional acid halide with the substrate film after the contact of the above aqueous solution of polyfunctional acid halide to form a separating functional layer comprising crosslinked polyamide on a porous substrate film by means of interfacial polycondensation, and then further contacting an organic solvent solution comprising aliphatic acid halide which is different from the above-described polyfunctional acid halide.

In this case, the concentration of the polyfunctional acid halide in the organic solvent solution is also preferably from 0.01 to 10% by weight, more preferably from 0.02 to 2% by weight. When the concentration is 0.01% by weight or more, sufficient reaction rate can be obtained. When it is 10% by weight or less, side reactions can be inhibited.

Also, when the separating functional layer is formed by mixing the polyfunctional acid halide with the aliphatic acid halide in a single organic solvent solution, the concentration of the aliphatic acid halide is preferably from 5 mol % to 50 mol %, more preferably from 10 mol % to 30 mol %, per the polyfunctional acid halide. When the concentration is 5 mol % or more, the removal performance can be sufficiently obtained. When it is 50 mol % or less, decrease of the salt removal performance and the permeation flow rate can be inhibited.

In the present invention, a crosslinked polyamide separating functional layer formed by interfacial polycondensation of an aqueous solution of polyfunctional amine and an organic solvent solution containing polyfunctional acid halide is brought into contact with a water-soluble organic material to form a composite semipermeable membrane. The method of bringing the water-soluble organic material into contact with the crosslinked polyamide separating functional layer is not particularly limited. The method includes, for example, a method of immersing an entire semipermeable membrane into a water-soluble organic material or a method of coating a water-soluble organic material on the surface of a separating functional layer when the water-soluble organic material is liquid, or a method of passing a semipermeable membrane in the atmosphere of a water-soluble organic material when the water-soluble organic material is gas. Further, a method of dissolving a water-soluble organic material in a solvent not attacking a composite semipermeable membrane to be treated and coating the solution to the composite semipermeable membrane to be treated, or a method of dipping a composite semipermeable membrane to be treated in the solution can be used. The solvent not attacking the composite semipermeable membrane to be treated is a solvent that does not dissolve or swell the skeleton of the semipermeable membrane layer of the composite semipermeable membrane to be treated, or the porous substrate membrane layer remarkably and does not impair the film performance greatly. Preferred examples include water, alcohols, hydrocarbons and the like. Among these, use of water is preferred considering the solubility of the water-soluble organic material, easy handling, and the economicity.

In this case, the concentration of the water-soluble organic material is, preferably from 10 ppm to 50% by weight, more preferably from 0.01 to 20% by weight, based on the solvent. This is because the contact is sufficient and the boron removing performance as the effect of the present invention can be obtained at the concentration of 0.01% by weight or more, and a sufficient solubility to the solvent is shown and the cost is reduced at 20% by weight or less.

For obtaining a sufficient effect by the contact, the contact is carried out in an atmosphere preferably at a temperature of 0° C. to 100° C. The temperature is preferably 70° C. or lower. When the reaction is carried out at a temperature of more than 100° C., the film causes heat shrink tending to lower the amount of water permeation.

The reaction time is preferably from 10 seconds to 500 hours. When the reaction time is less than 10 seconds, the reaction does not proceeds sufficiently and, when it is more than 500 hours, the production efficiency is worsened remarkably.

While the thus obtained composite semipermeable membrane can be used as it is, residues are preferably removed, for example, by water washing before use. It, is preferred to wash the membrane with water at a temperature of 0 to 100° C. thereby removing remaining water-soluble organic material, etc. Further, washing can be carried out by dipping the support film into water within the temperature range described above, or blowing water within such a range. When the temperature of water used is lower than 0° C., the amine compounds or water-soluble organic material remain in the composite semipermeable membrane tending to lower the amount of water permeation. Further, when washing is carried out at a temperature exceeding 100° C. using an autoclave or steams, the membrane causes heat shrink tending to lower the amount of water permeation as well.

Further, it is also preferred to subsequently bring the membrane into contact with an aqueous chlorine-containing solution at a pH of 6 to 13 under a normal pressure to improve the rejection ratio and the water permeability of the film.

The composite semipermeable membrane thus formed of the present invention is favorable for a spiral, composite semipermeable membrane element, in which the membrane of the present invention is wound around a water collector tube having a large number of holes formed therethrough, along with a crude water pass material such as plastic net and a permeate water pass material such as tricot and optionally a film for increasing the pressure resistance of the element. The elements can be connected in series or in parallel and housed in a pressure container to construct a composite semipermeable membrane module.

In the present invention, a method of immersing an osmotic membrane element (for example, envelope-like membranes connected to a water collecting tube and wound spirally) into an aqueous solution containing a water-soluble organic material at a normal temperature can be used. While the immersion time is different depending on the temperature, it is preferably from 1 second to 500 hours, more preferably from 10 seconds to 24 hours. When the immersion time is less than 1 second, the effect of improving the boron removal ratio described above can not be attained satisfactorily, and when it exceeds 500 hours, improvement for the boron removal ratio is saturated to take a long time unnecessarily. Further, in the present invention, the treatment with the aqueous solution containing the water-soluble organic material can be carried out also by assembling a reverse osmotic membrane module and then passing an aqueous solution containing the water-soluble organic material under pressure.

The composite semipermeable membrane and its element and module can be combined with a pump for feeding crude water thereto and with a equipment for crude water pretreatment to construct a fluid separation equipment. By using the separation equipment, crude water can be separated into permeate water such as drinking water and concentrated water not having permeated through the membrane, and the objective water can be obtained.

When the operation pressure to the fluid separation equipment is high, the boron removal ratio becomes high, but the energy necessary for operation becomes also high. Therefore, in consideration of the durability of the composite semipermeable membrane, the operation pressure under which crude water is led to pass through the membrane is preferably from 1.0 to 10 MPa. When the temperature of crude water to be treated is high, the boron removal ratio is increased; but when the temperature is low, the membrane permeation flow rate is decreased. Therefore, the temperature is preferably from 5° C. to 45° C. When the pH of crude water is high, boron in the crude water is dissociated into a boride ion so that the boron removal ratio is increased. However, high-brackish water such as seawater may form scale of magnesium and high-pH water may worsen the membrane. Therefore, it is preferable that the equipment is operated in a neutral region.

The present invention is explained below in detail based on Examples and Comparative Examples. Unless otherwise indicated, "%" is "% by weight".

The measurements in Examples and Comparative Examples were carried out as follows:

Salt Removal Ratio:

Seawater controlled to have a temperature of 25° C. and a pH of 6.5 (and having a TDS concentration of about 3.5% and a boron concentration of about 5.0 ppm) is applied to a composite semipermeable membrane under an operation pressure of 5.5 MPa, and the salt concentration in the permeate is measured. The salt removal through the membrane is determined according to the following formula:

Salt removal ratio=100×{1−(salt concentration in permeate/salt concentration in seawater)}.

Membrane Permeation Flow Rate:

Seawater is applied to a composite semipermeable membrane, and the amount ($m^3$) of the permeate through $m^2$ of the membrane a day indicates the membrane permeation flow rate ($m^3/m^2/day$).

Boron Removal Ratio:

The boron concentrations in crude water and permeate are measured with an ICP emission spectrophotometer, and the boron rejection is determined as follows:

Boron removal ratio=100×{1−(boron concentration in permeate/boron concentration in crude water)}.

Salt Transmission Coefficient:

The salt transmission coefficient is determined according to the following formula described in *Compendium of Membrane Separation Technology* (*Maku Shori Gijyutsu Taikei*), The first volume, p. 171, edited by Masayuki Nakagaki, published by Fuji-technosystem (1991):

Salt transmission coefficient (m/s)={(100−salt removal ratio)/salt removal ratio}×membrane permeation flow rate×$115.7 \times 10^{-7}$ Positron Annihilation Lifetime Spectroscopy by Positron Beam Method:

When the positron annihilation lifetime spectroscopy of the separating functional layer in the composite semipermeable membrane is measured without any processing, the measurement can be carried out by using a positron beam method as follows. Specifically, the separating functional layer is dried under reduced pressure at room temperature, and cut out to a square of 1.5 cm×1.5 cm as a test sample. In a thin membrane-corresponding positron annihilation lifetime spectroscopy device equipped with a positron beam generator (the device is explained in detail, for example, in *Radiation Physics and Chemistry,* 58, 603, Pergamon (2000)), the test sample is measured at a beam intensity of 1 keV and at room temperature in vacuo and at a total count number of 5,000,000 with a scintillation counter made of barium bifluoride using a photomultiplier, and the analysis is carried out by POSITRONFIT. The mean pore radius R, the mean pore volume V, the relative intensity I and the vacancy content V×I can be analyzed from the mean lifetime τ of the fourth component obtained by the analysis.

Abbreviations:

The following abbreviations are used in the following Tables.
PolyAm: polyfunctional polyamine
MonoAm: monofunctional amine
AcH(Ar): polyfunctional acid halide
AcH(Al): aliphatic acid halide
PEG20000: polyethylene glycol (average molecule weight: about 20000)
mPDA: metaphenylenediamine
TMC: trimesoyl chloride 95° C. for 2 minutes. The composite semipermeable membranes thus obtained were evaluated, and the membrane permeation flow rate, salt removal ratio, boron removal ratio and salt transmission coefficient are shown in Table 1.

REFERENCE EXAMPLE 3

A composite semipermeable membranes was produced in the same manner as in Reference Examples 2, except for without dipping an aqueous solution of sodium hypochlorite which had been controlled to have a pH of 7 and a chlorine concentration of 200 mg/liter, for 2 minutes. The composite semipermeable membranes thus obtained were evaluated, and the membrane permeation flow rate, salt removal ratio, boron removal ratio and salt transmission coefficient are shown in Table 1.

TABLE 1

| Ref. Ex. | Poly Am | Mono Am | AcH—Ar | AcH—Al (mol ratio per AcH—Ar) | Membrane permeation flow rate ($m^3/m^2/d$) | Salt removal ratio (%) | Boron removal ratio (%) | Salt transmission coefficient ($\times 10^{-8}$ m/s) |
|---|---|---|---|---|---|---|---|---|
| 1 | mPDA | None | TMC | None | 1.05 | 99.88 | 89.70 | 1.46 |
| 2 | 3.4% | | 0.15% | OC0.014% (20 mol %) | 0.62 | 99.81 | 93.28 | 1.37 |
| 3 | | | | OC0.014% (20 mol %) | 0.49 | 99.74 | 93.70 | 1.48 |

OC: oxalyl chloride
MA: methylamine
EA: ethylamine
TPC: terephthaloyl chloride
AC: acetyl chloride
FC: fumaryl chloride
SC: succinyl chloride
ε-CL: ε-caprolactam

REFERENCE EXAMPLES 1 AND 2

An N,N-dimethylformamide (DMF) solution of 15.3% polysulfone was cast on polyester nonwoven fabric (permeability: 0.5 to 1 cc/cm²·sec) at room temperature (25° C.) to a thickness of 200 μm, then immediately dipped in pure water and left therein for 5 minutes to prepare a porous substrate film. The thus formed porous substrate film (thickness: 210 to 215 μm) was dipped in an aqueous amine solution containing polyfunctional amine described in Table 1 for 2 minutes, then gradually pulled up in the vertical direction, exposed to nitrogen blow from an air nozzle to thereby remove the excess solution from the surface of the substrate film, and then an n-decane solution containing polyfunctional acid halide described in Table 1 was applied thereto so as to completely wet its surface, and kept as such for 1 minute. Next, the film was vertically held for 2 minutes so as to remove the excess solution from it, and the film was dewatered. Next, this was washed with hot water at 90° C. for 2 minutes, and dipped in an aqueous solution of sodium hypochlorite which had been controlled to have a pH of 7 and a chlorine concentration of 200 mg/liter, for 2 minutes, and then in an aqueous solution having a sodium hydrogensulfite concentration of 1,000 mg/liter to reduce and remove the excess sodium hypochlorite. Furthermore, the film was again washed with hot water at

EXAMPLES 1 TO 22

A water-soluble organic material described in Table 2 was dissolved in water to reach a definite concentration to prepare a solution. If necessary, about 10% of isopropyl alcohol was added thereto. Each of the composite semipermeable membranes obtained in Reference Examples 1 to 3 was dipped in this aqueous solution at room temperature for a definite time. Then, the membrane was washed with pure water to obtain a new composite semipermeable membrane. The composite semipermeable membranes thus obtained were evaluated, and the membrane permeation flow rate, salt removal ratio, boron removal ratio and salt transmission coefficient are shown in Table 2.

EXAMPLE 23

The composite permeable membrane obtained in Reference Example 3 was dipped in an aqueous solution of 1% glutaraldehyde at room temperature for 60 minutes. Next, this was washed with pure water, and dipped in an aqueous solution of sodium hypochlorite which had been controlled to have a pH of 7 and a chlorine concentration of 200 mg/liter, for 2 minutes, and then in an aqueous solution having a sodium hydrogensulfite concentration of 1,000 mg/liter to reduce and remove the excess sodium hypochlorite. Furthermore, the film was again washed with hot water at 95° C. for 2 minutes. The composite semipermeable membrane thus obtained was evaluated, and the membrane permeation flow rate, salt removal ratio, boron removal ratio and salt transmission coefficient are shown in Table 2.

TABLE 2

| Ex | Contacted membrane (Ref. Ex.) | Water-soluble organic material | Conc. (%) | Contact time (min) | Membrane permeation flow rate ($m^3/m^2/d$) | Salt removal ratio (%) | Boron removal ratio (%) | Salt transmission coefficient ($\times 10^{-8}$ m/s) |
|---|---|---|---|---|---|---|---|---|
| 1 | 1 | benzalkonium chloride | 0.1 | 30 | 0.39 | 99.82 | 96.28 | 0.81 |
| 2 | 1 | cetyltrimethyl-ammonium chloride | 0.1 | 30 | 0.43 | 99.84 | 95.66 | 0.80 |
| 3 | 1 | tri-n-octylmethyl-ammonium chloride | 0.1 | 30 | 0.39 | 99.86 | 95.73 | 0.63 |
| 4 | 1 | glutaraldehyde | 1 | 60 | 0.53 | 99.91 | 95.94 | 0.55 |
| 5 | 3 | glyoxal | 0.1 | 60 | 0.29 | 99.78 | 95.26 | 0.74 |
| 6 | 3 | PEG20000 | 0.1 | 60 | 0.26 | 99.84 | 95.05 | 0.48 |
| 7 | 3 | acrolein | 0.1 | 60 | 0.18 | 99.73 | 97.59 | 0.56 |
| 8 | 3 | crotonaldehyde | 0.1 | 60 | 0.29 | 99.71 | 95.41 | 0.98 |
| 9 | 3 | glutaraldehyde | 0.1 | 60 | 0.23 | 99.75 | 96.70 | 0.67 |
| 10 | 3 | malonaldehyde tetramethylacetal | 0.1 | 60 | 0.36 | 99.60 | 95.08 | 1.67 |
| 11 | 3 | furfural | 0.1 | 60 | 0.39 | 99.78 | 95.26 | 0.99 |
| 12 | 3 | paraformaldehyde | 0.1 | 60 | 0.28 | 99.79 | 95.78 | 0.68 |
| 13 | 3 | 2-chloromalon-aldehyde | 0.1 | 60 | 0.29 | 99.63 | 95.89 | 1.25 |
| 14 | 3 | fumaraldehydebis-(dimethylacetal) | 0.1 | 60 | 0.32 | 99.67 | 96.32 | 1.23 |
| 15 | 3 | methacrolein | 0.1 | 60 | 025 | 99.71 | 96.44 | 0.84 |
| 16 | 3 | 2,4-hexadienal | 0.1 | 60 | 0.36 | 99.60 | 95.11 | 1.67 |
| 17 | 2 | glutaraldehyde | 1 | 60 | 0.53 | 99.89 | 96.18 | 0.68 |
| 18 | 2 | acrolein | 1 | 60 | 0.40 | 99.91 | 97.18 | 0.42 |
| 19 | 2 | ethylene glycol diglycidyl ether | 1 | 60 | 0.53 | 99.89 | 95.56 | 0.68 |
| 20 | 2 | o-phthalaldehyde | 1 | 60 | 0.48 | 99.90 | 96.74 | 0.56 |
| 21 | 2 | glutaraldehyde | 1 | 14400 | 0.19 | 99.88 | 98.64 | 0.26 |
| 22 | 2 | benzalkonium chloride | 1 | 60 | 0.32 | 99.65 | 96.67 | 1.30 |
| 23 | 3 | glutaraldehyde | 1 | 60 | 0.42 | 99.79 | 95.61 | 1.02 |

Comparative Example 1 to 10

The composite permeable membrane obtained in Reference Example 1 was dipped in an aqueous solution of 0.1% of each of the water-soluble compounds described in Table 3 at room temperature for 1 hour, followed by washing with pure water to obtain a new composite permeable. The composite semipermeable membranes thus obtained were evaluated, and the membrane permeation flow rate, salt removal ratio, boron removal ratio and salt transmission coefficient are shown in Table 3.

Comparative Example 11, 12 and 15 to 22

The same porous substrate film as in Reference Examples 1 and 2 was dipped in an aqueous solution in which amine and additive described in Table 4 were dissolved, for 2 minutes, then gradually pulled up in the vertical direction, exposed to nitrogen blow from an air nozzle to thereby remove the excess solution from the surface of the substrate film, and then an n-decane mixture solution of polyfunctional aromatic acid halide and aliphatic acid halide prepared at concentrations described in Table 4 was applied thereto so as to completely

TABLE 3

| Comp. Ex. | Contacted membrane (Ref. Ex.) | Water-soluble organic material | Conc. (%) | Membrane permeation flow rate ($m^3/m^2/d$) | Salt removal ratio (%) | Boron removal ratio (%) | Salt transmission coefficient ($\times 10^{-8}$ m/s) |
|---|---|---|---|---|---|---|---|
| 1 | Ref. Ex. 1 | acetic anhydride | 0.1 | 0.65 | 99.69 | 92.78 | 2.34 |
| 2 | | glutaric anhydride | 0.1 | 0.64 | 99.69 | 92.89 | 2.30 |
| 3 | | succinic anhydride | 0.1 | 0.65 | 99.65 | 92.53 | 2.64 |
| 4 | | maleic anhydride | 0.1 | 0.70 | 99.64 | 90.72 | 2.93 |
| 5 | | 1,2,4,5-benzenetetra-carboxylic bianhydride | 0.1 | 0.68 | 99.41 | 91.19 | 4.67 |
| 6 | | methyl acrylate | 0.1 | 0.76 | 99.54 | 90.81 | 4.06 |
| 7 | | hydroxyethyl acrylate | 0.1 | 0.79 | 99.47 | 90.32 | 4.87 |
| 8 | | acrylamide | 0.1 | 0.78 | 99.30 | 90.58 | 6.36 |
| 9 | | N-isopropylacrylamide | 0.1 | 0.80 | 99.24 | 89.91 | 7.09 |
| 10 | | 2-acrylamido-2-methyl propane sulfonic acid | 0.1 | 0.81 | 99.14 | 89.26 | 8.13 | wet its surface, and kept as such for 1 minute. Next, the film was vertically held for 1 minute and dewatered. Next, this was dried in air to remove the decane solvent, and then washed with running tap water so as to remove the chemicals remaining in the film. Then, this was washed with hot water at 90° C. for 2 minutes, and dipped in an aqueous solution of sodium hypochlorite which had been controlled to have a pH of 7 and a chlorine concentration of 200 mg/liter, for 2 minutes, and then in an aqueous solution containing 1,000 mg/liter of sodium hydrogensulfite. Furthermore, the film was again washed with hot water at 95° C. for 2 minutes.

The composite semipermeable membranes thus obtained were evaluated, and the membrane permeation flow rate, salt removal ratio, boron removal ratio, and salt transmission coefficient are shown in Table 4.

200 mg/liter, for 2 minutes, and then in an aqueous solution containing 1,000 mg/liter of sodium hydrogensulfite. Furthermore, the film was again washed with hot water at 95° C. for 2 minutes.

The composite semipermeable membranes thus obtained were evaluated, and the membrane permeation flow rate, salt removal ratio, boron removal ratio, and salt transmission coefficient are shown in Table 4.

TABLE 4

| Comp. Ex. | Poly Am | MonoAm | AcH—Ar | AcH—Al (mol ratio per AcH—Ar) | Membrane permeation flow rate ($m^3/m^2/d$) | Salt removal ratio (%) | Boron removal ratio (%) | Salt transmission coefficient ($\times 10^{-8}$ m/s) |
|---|---|---|---|---|---|---|---|---|
| 11 | mPDA 2.9% | MA 0.5% | TMC 0.12% | None | 0.60 | 99.70 | 94.20 | 2.09 |
| 12 | | EA 0.5% | | | 0.70 | 99.70 | 93.10 | 2.44 |
| 13 | mPDA 3.4% | MA 1.0% | TPC 0.18% | | 0.60 | 99.60 | 93.80 | 2.79 |
| 14 | | EA 1.0% | | | 0.60 | 99.60 | 93.20 | 2.79 |
| 15 | mPDA 3.4% | None | TMC 0.15% | OC 0.0022% (3 mol %) | 0.82 | 99.92 | 92.25 | 0.76 |
| 16 | | | | OC 0.0036% (5 mol %) | 0.69 | 99.90 | 92.95 | 0.80 |
| 17 | | | | OC 0.0072% (10 mol %) | 0.93 | 99.90 | 92.63 | 1.08 |
| 18 | | | | OC 0.022% (30 mol %) | 0.50 | 99.82 | 94.01 | 1.04 |
| 19 | | | | OC 0.036% (50 mol %) | 0.57 | 99.71 | 93.26 | 1.92 |
| 20 | | | | AC 0.0044% (10 mol %) | 1.07 | 99.92 | 91.35 | 0.99 |
| 21 | | | | FC 0.0086% (10 mol %) | 0.88 | 99.88 | 92.42 | 1.22 |
| 22 | | | | SC 0.0087% (10 mol %) | 0.85 | 99.89 | 92.15 | 1.08 |

Comparative Example 13 and 14

The same porous substrate film as in Reference Examples 1 and 2 was dipped in an aqueous amine solution containing polyfunctional amine described in Table 4 for 2 minutes, then gradually pulled up in the vertical direction, exposed to nitrogen blow from an air nozzle to thereby remove the excess solution from the surface of the substrate film, and then an n-decane solution containing 0.12% trimesoyl chloride and 0.18% terephthaloyl chloride was applied thereto so as to completely wet its surface, and kept as such for 1 minute. Next, the film was vertically held for 2 minutes and dewatered to thereby remove the excess solution from the substrate film. Next, an aqueous amine solution containing monofunctional amine described in Table 4 and 0.3% sodium dodecyl sulfate was applied thereto. Next, this was dried in air to remove the excess solution from the surface of the substrate film, and then washed with hot tap water at 90° C. Then, this was dipped in an aqueous solution of sodium hypochlorite which had been controlled to have a pH of 7 and a chlorine concentration of 200 mg/liter, for 2 minutes, and then in an aqueous solution containing 1,000 mg/liter of sodium hydrogensulfite. Furthermore, the film was again washed with hot water at 95° C. for 2 minutes.

Comparative Example 23 to 28

The same porous substrate film as in Reference Examples 1 and 2 was dipped in an aqueous solution in which amine and additive described in Table 4 were dissolved, for 2 minutes, then gradually pulled up in the vertical direction, exposed to nitrogen blow from an air nozzle to thereby remove the excess solution from the surface of the substrate film, and then an n-decane mixture solution of polyfunctional aromatic acid halide and aliphatic acid halide prepared at concentrations described in Table 5 was applied thereto so as to completely wet its surface, and kept as such for 1 minute. Next, the film was vertically held for 1 minute and dewatered. Next, this was dried in air to remove the decane solvent, and then washed with running tap water so as to remove the chemicals remaining in the film. Then, this was washed with hot water at 90° C. for 2 minutes, and dipped in an aqueous solution of sodium hypochlorite which had been controlled to have a pH of 7 and a chlorine concentration of 200 mg/liter, for 2 minutes, and then in an aqueous solution containing 1,000 mg/liter of sodium hydrogensulfite. Furthermore, the film was again washed with hot water at 95° C. for 2 minutes.

The composite semipermeable membranes thus obtained were evaluated, and the membrane permeation flow rate, salt removal ratio, boron removal ratio, and salt transmission coefficient are shown in Table 5.

TABLE 5

| Comp. Ex. | Poly Am | Mono Am | AcH—Ar | AcH—Al (mol ratio per AcH—Ar) | Membrane permeation flow rate ($m^3/m^2/d$) | Salt removal ratio (%) | Boron removal ratio (%) | Salt transmission coefficient ($\times 10^{-8}$ m/s) |
|---|---|---|---|---|---|---|---|---|
| 23 | mPDA | None | TMC | None | 1.31 | 99.77 | 86.01 | 3.49 |
| 24 | 3.0% EDA 0.075% | | 0.10% | OC 0.0095% (20 mol %) | 1.37 | 99.79 | 85.70 | 3.34 |
| 25 | mPDA | | | None | 1.67 | 99.60 | 86.22 | 7.76 |
| 26 | 2.0% | | | OC 0.0095% (20 mol %) | 1.43 | 99.77 | 85.72 | 3.81 |
| 27 | mPDA | ε-CL | TMC | None | 1.44 | 99.76 | 80.00 | 4.01 |
| 28 | 1.5% | 2.25% | 0.075% | OC 0.0072% (20 mol %) | 1.68 | 99.62 | 77.19 | 7.41 |

Comparative Example 29 to 31

The membrane permeation flow rate, salt removal ratio, boron removal ratio, and salt transmission coefficient of the composite semipermeable membranes prepared by the processes described in Examples 1 to 3 in JP-A-2004-243198 were evaluated. The details are shown below.

Comparative Example 29

Taffeta which was 30 cm long and 20 cm wide and was made of a polyester fiber (multifirament threads of 166 dtex in both the warp and the weft, yarn density: the warp: 90 lines/inch, the weft: 67 lines/inch, thickness: 160 μm) was fixed on a glass plate, and an N,N-dimethylformamide (DMF) solution of 15.7% polysulfone was cast thereon 25° C. to a thickness of 200 μm, then immediately dipped in pure water and left therein for 5 minutes. Then, this was treated with hot water at 90° C. for 2 minutes to prepare a porous substrate film (hereinafter referred to as "FT-PS substrate film"). The FT-PS substrate film has a thickness of 200 to 210 μm and a pure water transmission coefficient of 0.01 to 0.03 g/cm²·sec·atm measured at pressure of 0.1 MPa, liquid temperature of 25° C. and atmosphere temperature of 25° C.

The FT-PS porous substrate film was dipped in an aqueous solution containing 1% m-phenylenediamine and 1% s-caprolactam for 1 minute, then gradually pulled up in the vertical direction and dewatered to remove the excess solution from the surface of the substrate film, and then an n-decane mixture solution containing 0.06% trimesoyl chloride was applied thereto so as to completely wet its surface, and kept as such for 1 minute. Next, the film was vertically held for 1 minute and dewatered to remove the excess solution. Next, air at 30° C. was blown thereto at a wind velocity of 8 m/s on the surface of the film for 1 minute to remove the solvent on the surface of the film.

An aqueous solution containing 1.0% glutaraldehyde was applied to the surface of the film, and kept as such for 2 minutes. Then, this was dipped in hot water at 90° C. for 2 minutes, and, in order to improve the membrane performance, dipped in an aqueous solution of sodium hypochlorite which had been controlled to have a pH of 7 and a chlorine concentration of 500 ppm, for 2 minutes, and then in an aqueous solution containing 1,000 ppm sodium hydrogensulfite to remove the remaining sodium hypochlorite to thereby obtain a composite semipermeable membrane.

Comparative Example 30

The composite semipermeable membrane was prepared and evaluated in the same manner as in Comparative Example 29, except for using formalin instead of glutaraldehyde.

Comparative Example 31

The composite semipermeable membrane was prepared and evaluated in the same manner as in Comparative Example 29, except that heat treatment was carried out at 80° C. after the application of 0.4% glutaraldehyde.

Comparative Example 32

The composite semipermeable membrane was prepared and evaluated in the same manner as in Comparative Example 29, except that the application of an aqueous solution containing 1.0% glutaraldehyde to the surface of the film and the keeping for 2 minutes were not carried out.

Comparative Example 33

The composite semipermeable membrane was prepared and evaluated in the same manner as in Comparative Example 29, except that the application of an aqueous solution containing 1.0% glutaraldehyde to the surface of the film and the keeping for 2 minutes were not carried out, and that the dipping in an aqueous solution of sodium hypochlorite which had been controlled to have a pH of 7 and a chlorine concentration of 500 ppm, for 2 minutes for improving the membrane performance was not carried out.

The composite semipermeable membranes in Comparative Examples 29 to 33 were evaluated, and the membrane permeation flow rate, salt removal ratio, boron removal ratio, and salt transmission coefficient are shown in Table 6.

TABLE 6

| Comp. Ex. | Poly Am | Mono Am | AcH—Ar | Membrane production method | Membrane permeation flow rate (m³/m²/d) | Salt removal ratio (%) | Boron removal ratio (%) | Salt transmission coefficient (×10⁻⁸ m/s) |
|---|---|---|---|---|---|---|---|---|
| 29 | mPDA | ε-CL | TMC | JP-A-2004-243198 | 1.65 | 99.56 | 81.57 | 8.44 |
| 30 | 1.0% | 1.0% | 0.06% | | 1.86 | 99.62 | 77.65 | 8.21 |
| 31 | | | | | 1.42 | 99.59 | 82.22 | 6.76 |
| 32 | | | | | 1.83 | 99.44 | 75.58 | 11.92 |
| 33 | | | | | 1.02 | 99.06 | 77.31 | 11.20 |

EXAMPLE 24

The composite semipermeable membrane prepared in the same manner as in Reference Example 1 was dipped in an aqueous solution of 0.1% glutaraldehyde for 1 hour, and washed with pure water to thereby prepare a composite semipermeable membrane. The positron annihilation lifetime spectroscopy by the positron beam method and the evaluation of membrane permeability were carried out for this composite semipermeable membrane. The results are shows in Table 7 and FIG. 1.

Comparative Example 34

The same porous substrate film as in Reference Examples 1 and 2 was dipped in an aqueous solution of 3.4% mPDA for 2 minutes, then gradually pulled up in the vertical direction, exposed to nitrogen blow from an air nozzle to thereby remove the excess solution from the surface of the substrate film, and then an n-decane solution of 0.165% TMC was applied thereto so as to completely wet its surface, and kept as such for 1 minute. Next, the film was vertically held for 1 minute and dewatered. Next, this was dried in air to remove the decane solvent, and then washed with running tap water so as to remove the chemicals remaining in the film. Then, this was washed with hot water at 90° C. for 2 minutes, and dipped in an aqueous solution of sodium hypochlorite which had been controlled to have a pH of 7 and a chlorine concentration of 200 mg/liter, for 2 minutes, and then in an aqueous solution containing 1,000 mg/liter of sodium hydrogensulfite. Furthermore, the film was again washed with hot water at 95° C. for 2 minutes. The positron annihilation lifetime spectroscopy and the evaluation of membrane permeability of the composite semipermeable membrane thus obtained were carried out in the same manner as in Example 24 and the results are shows in Table 7 and FIG. 1.

Comparative Example 35

The same porous substrate film as in Reference Examples 1 and 2 was dipped in an aqueous solution of 0.55% triaminobenzene, 1.45% mPDA and 0.15% ethylenediamine for 2 minutes, then gradually pulled up in the vertical direction, exposed to nitrogen blow from an air nozzle to thereby remove the excess solution from the surface of the substrate film, and then an n-decane solution of 0.0675% TMC and 0.0825% terephthaloyl chloride was applied thereto so as to completely wet its surface, and kept as such for 1 minute. Next, the film was vertically held for 1 minute and dewatered. Next, this was dried in air to remove the decane solvent, dipped in an aqueous solution of 1% sodium carbonate and 0.3% sodium dodecyl sulfate for 5 minutes, and then washed with running tap water so as to remove the chemicals remaining in the film. Then, this was washed with hot water at 70° C. for 2 minutes, and dipped in an aqueous solution of sodium hypochlorite which had been controlled to have a pH of 7 and a chlorine concentration of 500 mg/liter, for 2 minutes, and then in an aqueous solution containing 1,000 mg/liter of sodium hydrogensulfite.

The positron annihilation lifetime spectroscopy and the evaluation of membrane permeability of the composite semipermeable membrane thus obtained were carried out in the same manner as in Example 24 and the results are shows in Table 7 and FIG. 1.

Comparative Example 36

The same porous substrate film as in Reference Examples 1 and 2 was dipped in an aqueous solution of 0.46% triaminobenzene, 1.2% mPDA, 0.12% ethylenediamine and 1% ε-caprolactam for 2 minutes, then gradually pulled up in the vertical direction, exposed to nitrogen blow from an air nozzle to thereby remove the excess solution from the surface of the substrate film, and then an n-decane solution of 0.1% TMC was applied thereto so as to completely wet its surface, and kept as such for 1 minute. Next, the film was vertically held for 1 minute and dewatered. Next, this was dried in air to remove the decane solvent, dipped in an aqueous solution of 1% sodium carbonate and 0.3% sodium dodecyl sulfate for 5 minutes, and then washed with running tap water so as to remove the chemicals remaining in the film. Then, this was washed with hot water at 70° C. for 2 minutes, and dipped in an aqueous solution of sodium hypochlorite which had been controlled to have a pH of 7 and a chlorine concentration of 500 mg/liter, for 2 minutes, and then in an aqueous solution containing 1,000 mg/liter of sodium hydrogensulfite.

The positron annihilation lifetime spectroscopy and the evaluation of membrane permeability of the composite semipermeable membrane thus obtained were carried out in the same manner as in Example 24 and the results are shows in Table 7 and FIG. 1.

TABLE 7

| | Mean lifetime (ns) | Mean pore radius R (nm) | Mean pore volume V (nm³) | Relative intensity I (%) | Vacancy content V × I (nm³ %) | Membrane permeation flow rate (m³/m²/d) | Salt removal ratio (%) | Boron removal ratio (%) |
|---|---|---|---|---|---|---|---|---|
| Ex. 24 | 1.95 | 0.281 | 0.093 | 3.2 | 0.297 | 0.50 | 99.7 | 95.6 |
| Comp. Ex. 34 | 2.47 | 0.325 | 0.144 | 2.2 | 0.316 | 0.68 | 99.9 | 92.1 |
| Comp. Ex. 35 | 2.38 | 0.318 | 0.135 | 2.9 | 0.391 | 0.87 | 99.7 | 86.1 |
| Comp. Ex. 36 | 1.99 | 0.285 | 0.097 | 4.8 | 0.465 | 0.96 | 99.1 | 72.9 |

As shown in the above results, the present invention provides effects in which a composite semipermeable membrane having a boron removal ratio of 95% or more by contact with a water-soluble organic material.

INDUSTRIAL APPLICABILITY

As described above, the composite semipermeable membrane of the present invention attains high salt removal and high permeate transmission, and rejects even substances which are non-dissociable in a neutral region, such as boron. Accordingly, the membrane is favorable for treatment of cooling water in atomic power plants, for treatment of plating wastes, and for production of drinking water from high-concentration brackish water or seawater.

While the present invention has been described in detail and with reference to specific embodiments thereof, it will be apparent to one of skill in the art that various changes and modifications can be made therein without departing from the spirit and scope thereof. All references cited herein are incorporated in their entirety.

This application is based on Japanese application No. 2004-330273 filed on Nov. 15, 2004, the entire contents of which are incorporated hereinto by reference.

The invention claimed is:

1. A composite semipermeable membrane comprising a separating functional layer comprising a reactant of polyfunctional amine with polyfunctional acid halide on a porous substrate film, wherein a water-soluble organic material, which comprises a compound or derivative selected from the group consisting of a compound having a formyl group, a derivative of a compound having a formyl group, a compound having an oxilanyl group, a derivative of a compound having a oxilanyl group, a carbonate derivative, a carbamate derivative, and an alkyl halide, is in contact with the separating functional layer, and the separating functional layer has a boron removal ratio of 95% or more, when seawater at 25° C. having a pH of 6.5, a boron concentration of 5 ppm and a TDS concentration of 3.5% by weight is permeated under an operation pressure of 5.5 MPa.

2. The composite semipermeable membrane according to claim 1, wherein the separating functional layer has a mean pore radius of 0.25 nm to 0.35 nm and a vacancy content of 0.2 nm³% to 0.3 nm³%, measured by positron annihilation lifetime spectroscopy.

3. The composite semipermeable membrane according to claim 1, which is obtainable by contacting the water-soluble organic material with a composite semipermeable membrane to be treated, which has a salt removal ratio of 99.5% or more or a salt transmission coefficient of $3 \times 10^{-8}$ m/s or less, when seawater at 25° C. having a pH of 6.5, a boron concentration of 5 ppm and a TDS concentration of 3.5% by weight is permeated under an operation pressure of 5.5 MPa.

4. The composite semipermeable membrane according to claim 1, wherein the polyfunctional amine is aromatic polyfunctional amine.

5. The composite semipermeable membrane according to claim 1, wherein the compound having a formyl group is aldehyde having at least two functional groups which are capable of binding to amine via a covalent bond.

6. The composite semipermeable membrane according to claim 1, wherein the compound having a oxilanyl group is epoxide having at least two functional groups which are capable of binding to amine via a covalent bond.

7. The composite semipermeable membrane according to claim 1, wherein the water-soluble organic material has a molecular weight of 1,000 or less.

8. The composite semipermeable membrane according to claim 1, wherein the water-soluble organic material comprises a compound having a formyl group.

9. The composite semipermeable membrane according to claim 1, wherein the water-soluble organic material forms a covalent bond with an amino group of the separating functional layer.

10. A process for producing a composite semipermeable membrane, the process comprising:

contacting polyfunctional amine with polyfunctional acid halide on a porous substrate film to thereby form a separating functional layer comprising polyamide by polycondensation; and contacting the separating functional layer with a water-soluble organic material comprising a compound or derivative selected from the group consisting of a compound having a formyl group, a derivative of a compound having a formyl group, a compound having an oxilanyl group, a derivative of a compound having a oxilanyl group, a carbonate derivative, a carbamate derivative, and an alkyl halide, resulting in the separating functional layer having a boron removal ratio of 95% or more, when seawater at 25° C. having a pH of 6.5, a boron concentration of 5 ppm and a TDS concentration of 3.5% by weight is permeated under an operation pressure of 5.5 MPa.

11. The process according to claim 10, wherein the separating functional layer has a mean pore radius of 0.25 nm to 0.35 nm and a vacancy content of 0.2 nm³% to 0.3 nm³%, measured by positron annihilation lifetime spectroscopy.

12. The process according to claim 10, wherein the water-soluble organic material is brought into contact with a composite semipermeable membrane to be treated, which has a salt removal ratio of 99.5% or more or a salt transmission coefficient of $3\times10^{-8}$ m/s or less, when seawater at 25° C. having a pH of 6.5, a boron concentration of 5 ppm and a TDS concentration of 3.5% by weight is permeated under an operation pressure of 5.5 MPa.

13. The process according to claim 10, wherein the polyfunctional amine is aromatic polyfunctional amine.

14. The process according to claim 10, wherein the compound having a formyl group is aldehyde having at least two functional groups which are capable of binding to amine via a covalent bond.

15. The process according to claim 10, wherein the compound having an oxilanyl group is epoxide having at least two functional groups which are capable of binding to amine via a covalent bond.

16. The process according to claim 10, wherein the water-soluble organic material has a molecular weight of 1,000 or less.

17. The process according to claim 10, wherein the water-soluble organic material comprises a compound having a formyl group.

18. The process according to claim 10, wherein the water-soluble organic material forms a covalent bond with an amino group of the separating functional layer.

* * * * *